(12) United States Patent
Paeschke et al.

(10) Patent No.: US 8,555,073 B2
(45) Date of Patent: Oct. 8, 2013

(54) MOTOR VEHICLE DISPLAY APPARATUS, MOTOR VEHICLE ELECTRONIC SYSTEM, MOTOR VEHICLE, METHOD FOR DISPLAYING DATA, AND COMPUTER PROGRAM PRODUCT

(75) Inventors: Manfred Paeschke, Wandlitz (DE); Frank Dietrich, Berlin (DE); Jörg Fischer, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 52 days.

(21) Appl. No.: 13/125,575

(22) PCT Filed: Oct. 20, 2009

(86) PCT No.: PCT/EP2009/063740
§ 371 (c)(1),
(2), (4) Date: Aug. 18, 2011

(87) PCT Pub. No.: WO2010/046363
PCT Pub. Date: Apr. 29, 2010

(65) Prior Publication Data
US 2011/0296190 A1    Dec. 1, 2011

(30) Foreign Application Priority Data
Oct. 23, 2008   (DE) .......................... 10 2008 043 123

(51) Int. Cl.
*H04L 29/06* (2006.01)
(52) U.S. Cl.
USPC ........................... 713/176; 713/156; 340/990
(58) Field of Classification Search
USPC .................... 713/156, 176; 340/990
See application file for complete search history.

(56) References Cited

U.S. PATENT DOCUMENTS 6,859,149 B1 * 2/2005 Ohta et al. ............ 340/990
2004/0003237 A1 * 1/2004 Puhl et al. ............ 713/156

FOREIGN PATENT DOCUMENTS

| DE | 20 2004 017458 U1 | 2/2005 |
| DE | 10 2006 025023 A1 | 11/2007 |
| FR | 2 902 385 A | 12/2007 |
| WO | WO 99/19170 A | 4/1999 |
| WO | WO 99/32329 A | 7/1999 |

* cited by examiner

*Primary Examiner* — Brandon Hoffman
*Assistant Examiner* — Michael D Anderson
(74) *Attorney, Agent, or Firm* — Hulsey, P.C.; William Hulsey; Loren Smith

(57) ABSTRACT

The invention relates to a motor vehicle display apparatus with an electronic device, comprising:
a first memory area (117) for storing data (109),
a second memory area (119) for storing at least a first certificate (178),
a first interface (103) for receiving the data, a signature of the data and of the at least first certificate from a sender (107),
means (123) for checking validity of the signature of the data by using the first certificate, wherein the data is only stored in the first memory area if the signature is valid,
means (127) for driving a display apparatus for displaying the data stored in the first memory area,
and comprising the display apparatus (136), wherein the display apparatus and the electronic device form a structural unit.

19 Claims, 5 Drawing Sheets

Figure 1:
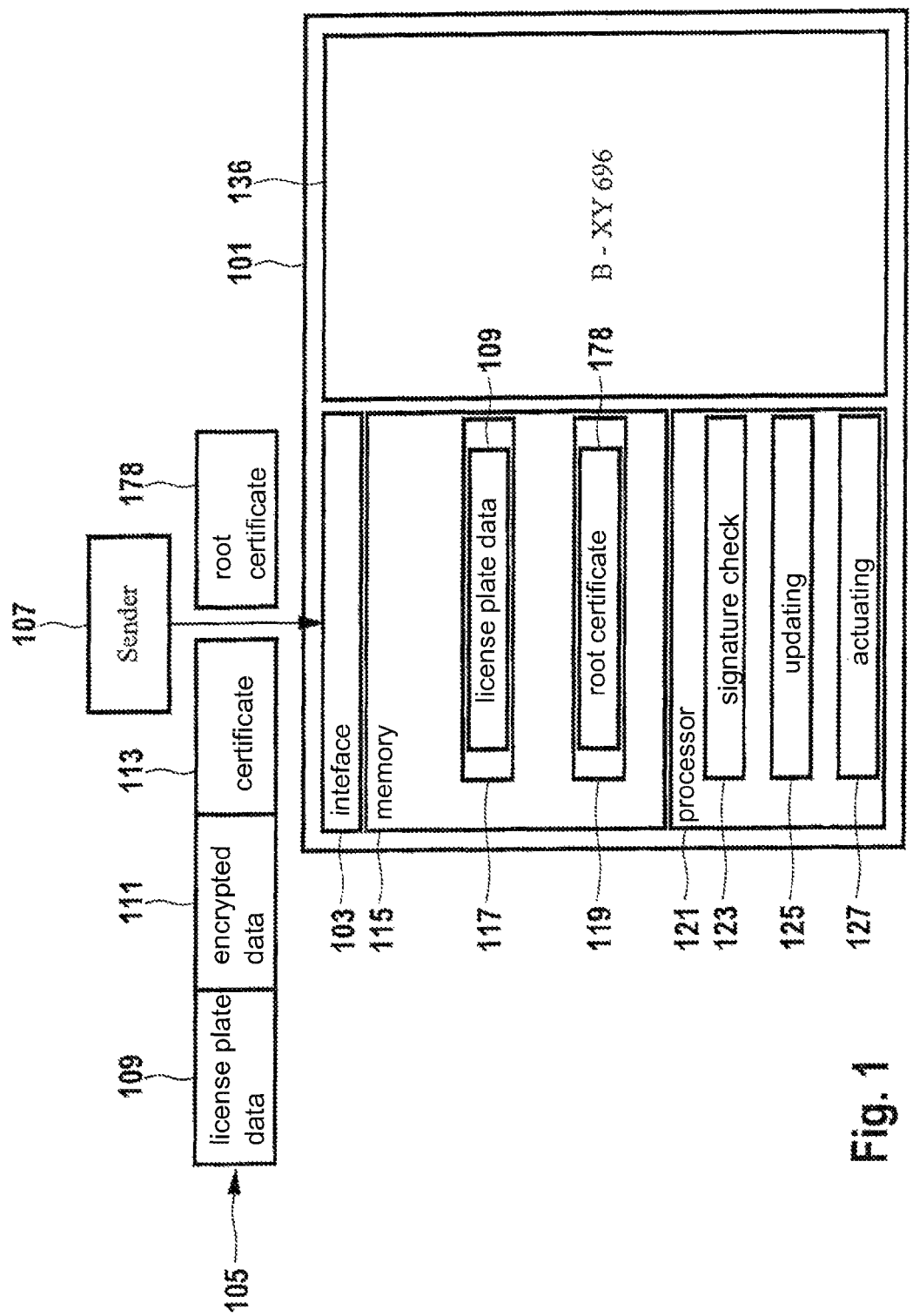

MOTOR VEHICLE DISPLAY APPARATUS, MOTOR VEHICLE ELECTRONIC SYSTEM, MOTOR VEHICLE, METHOD FOR DISPLAYING DATA, AND COMPUTER PROGRAM PRODUCT

The invention relates to a motor vehicle display apparatus, a motor vehicle electronic system, a motor vehicle, a method for displaying data, and a computer program product.

From U.S. Pat. No. 5,657,008, an electronic motor vehicle license number is known in which a vehicle identification number is stored. The vehicle identification number is used for checking whether the electronic motor vehicle license number also actually belongs to the motor vehicle to which it is attached.

From WO 2007/137555 A2, an electronically configurable motor vehicle license number with a display is known. In order to configure the motor vehicle license number, data are assembled in an external configuration unit and encrypted. The encrypted data are sent out as infrared signals by an infrared transmitter integrated in the configuration unit. The signals are decrypted in the display electronics for the motor vehicle license number, for which purpose a corresponding decryption software is stored in the display electronics.

From US 2007/0285361 A1, a system for wireless electronic motor vehicle license numbers is known. The inputting of data into the electronic motor vehicle license number is only possible for persons authorized to do this, namely with the aid of a secret code.

From DE 102008042259.2 of the same applicant which was unpublished at the filing date of this application a motor vehicle electronics device which is adapted to receive data from an ID token and to control a motor vehicle display device for displaying this data.

By comparison, the invention is based on the object of creating an improved motor vehicle display apparatus, an improved motor vehicle electronic system, an improved motor vehicle, an improved method for displaying data, and an improved computer program product.

The objects on which the invention is based are in each case achieved by means of the features of the independent patent claims. Embodiments of the invention are specified in the dependent patent claims.

According to embodiments of the invention the motor vehicle display apparatus has an electronic device and a display apparatus which form a structural unity. For example the dimensions of the motor vehicle display apparatus can correspond approximately to the dimensions of a motor vehicle number plate common in the state of the art.

The electronic device has a first memory area for storing data and a second memory area for storing at least a first certificate. Further, the electronic device has a first interface for receiving the data and a signature of the data as well as at least the first certificate. The data and their signature on the one hand and the first certificate on the other hand can be received from the same or different senders.

The electronic device has means for checking the validity of the signature of the data by using the first certificate. A necessary condition for storing the data in the first memory area is that the signature is valid. Only then this data is depicted by using means for controlling the display apparatus.

Embodiments of the invention are especially advantageous because at least the first certificate can be received over the first interface. The first certificate allows an update of the certificate or certificates stored in the electronic device. To be specific the certificates of a public key infrastructure (PKI) have commonly a limited validity of for example two to three years. After expiration of this validity time an update of the certificate or the certificates has to be performed which can be performed according to the invention over the interface of the electronic device.

According to an embodiment of the invention the first certificate is a so called root certificate by which a check of a certificate chain can be performed for checking the validity of the signature of the data.

According to an embodiment of the invention the electronic device is an integrated electronic circuit such as a so called RFID chip.

The first interface of the electronic device can be adapted to receive the data, their signature and/or the first certificate from the external sender wirelessly. Alternatively or additionally the first interface can also be adapted to receive the data, their signature and/or the first certificate from an internal sender that belongs to the motor vehicle such as a motor vehicle electronics device, in particular a so called electronic control unit (ECU).

According to an embodiment of the invention the electronic device and the display apparatus are intrinsically tied to each other such that separating the electronic device and the display apparatus is not possible without destroying them. For example for this purpose the electronic device and the display apparatus are tied to each other so deeply by using a jointing compound such that trying to separate them leads inevitably to destroying the electronic device and/or the display apparatus.

According to an embodiment of the invention the electronic device comprises means for cryptographically authenticating the sender, e.g. according to a so called challenge response protocol. Storing the data received from the sender in the first memory area is only performed if such a cryptographical authentication is performed successfully.

According to an embodiment of the invention the electronic device comprises means for mutually authenticating cryptographically the electronic device and the sender. By this it is ensured that the sender sends the data only to a valid electronic device.

According to a further embodiment of the invention the electronic device has a memory area for storing a motor vehicle identifier. The motor vehicle identifier is an identifier by which the motor vehicle is identified without ambiguity, e.g. the serial identification number of the motor vehicle. The motor vehicle display apparatus is assigned to the motor vehicle with the same motor vehicle identifier without ambiguity by the motor vehicle identifier stored in the memory area. This assignment can be performed in such a way that it is unchangeable. A further condition for storing the data in the first memory area for displaying it at the display apparatus can then be that identifying information is received over the first interface that is identical to the motor vehicle identifier which is stored in the memory area.

According to a further embodiment of the invention the motor vehicle display apparatus is an electronic motor vehicle number plate, i.e. a motor vehicle number plate that is equipped with a display on which the official license number is displayed.

In a further aspect the invention relates to a motor vehicle electronics system with an embodiment of the motor vehicle display apparatus according to the invention and a motor vehicle electronic device.

According to embodiments of the invention, the motor vehicle electronics device has a second interface for establishing a first connection to a first ID token in order to read data from the first ID token. The first ID token can be a document, particular a document of value or security into which an electronic memory and an interface for the establishment of the connection to the second interface of the motor vehicle electronics device are integrated. In particular, an RFID chip, in which the data are stored, can be integrated into the document.

According to the invention, a "document" is understood to be paper-based and/or plastic-based documents such as, for example, identification documents, particularly passports, identity cards, visa and driving licenses, vehicle registration documents, vehicle certificates of title, company identification cards, health insurance cards or other ID documents such as official ID cards and chip cards, payment cards, particularly bank cards and credit cards, freight bills or other proofs of authority into which a data memory is integrated for storing at least one attribute.

The document can preferably be an electronic vehicle registration document or certificate of title or another motor vehicle document.

The motor vehicle electronics device has a memory for storing a certificate of a public key infrastructure (PKI). For example, the certificate can correspond to the X.509 standard. Furthermore, a so-called root certificate of this PKI can be stored in the same memory or in another memory of the motor vehicle electronics device. The certificate and the root certificate have typically a limited period of validity which is specified in the certificate or the root certificate, respectively.

The motor vehicle electronics device also has means for the authentication with respect to the first ID token using the certificate. For example, the authentication takes place by using a challenge-response method. For this purpose, the motor vehicle electronics device transmits its certificate via the first connection to the first ID token. The latter generates a challenge, for example in the form of a pseudo random number which the first ID token encrypts with the public key of the certificate and transmits the enciphered text via the first connection to the motor vehicle electronics device. The motor vehicle electronics device must then have the private key allocated to the certificate in order to be able to decrypt these encrypted data correctly.

It can be optionally provided that the first ID token must also authenticate itself with respect to the motor vehicle electronics device before the data are read from the first ID token. This can occur analogously to the authentication of the motor vehicle electronics device with respect to the ID token. For example, the procedure is thus that the ID token transmits its certificate to the motor vehicle electronics device via the first connection and thereafter the challenge-response method is carried out. To check the validity of the certificate of the first ID token, the motor vehicle electronics device can use the root certificate.

The motor vehicle electronics device has means for actuating at least one display apparatus according to the invention for reproducing the data. For example, there are two display apparatuses which are arranged at the front and the rear of a motor vehicle instead of the usual license plates. The display devices have each at least one display, it being possible to use various display technologies.

For example, the displays are constructed in such a manner that the data can also be displayed without continuous power supply. Such displays only require electrical energy when the data to be displayed change.

These are, for example, bi-stable displays such as, for example, electrophoretic displays, electrochromic displays, rotating element displays, ferroelectric displays, displays based on the electrowetting effect and bi-stable LCD displays, for example twisted nematic, super twisted nematic, cholesteric or nematic LCD displays. They can also be hybrid displays which combine various ones of these display technologies with one another.

Furthermore, flexible bi-stable displays which can be obtained commercially from the company Citala are known from the prior art. Such displays are also known from US 2006/0250534 A1. Further bi-stable electrophoretic displays are known, for example, from WO 99/53371 and EP 1 715 374 A1.

Bi-stable displays are also called "electronic paper displays" (EPDs).

Such bi-stable displays generally have the advantage that they can be read very easily in bright illumination and that no power supply is required for reproducing image data remaining constant over a long period.

Emissive displays can also be used which need a power supply for reproducing the data. These can be, for example LED displays, in particular anorganic, organic or hybrid LED displays. The display apparatus can also be implemented on the basis of an electroluminescent medium as is known per se, for example, from US 2002/0079494 A1 and U.S. Pat. No. 6,091,194.

The whole display apparatus or a part of the display apparatus can also be applied by printing technology and thus form an intimate and undetachable connection with the motor vehicle or parts of the motor vehicle, respectively. The production of, for example, TFTs for by direct application with the aid of printing technology is known per se from WO 03/098696 A1.

The motor vehicle electronics device also has a third interface for storing the certificate in the memory. It is thus possible to access the memory of the motor vehicle electronics device via the third interface in order to transmit the certificate there and to store it, for example in order to enter the certificate for the first time in the memory in the case of a new motor vehicle or in order to update the certificate.

According to one embodiment of the invention, the data which are read from the first ID token via the second interface contain the official motor vehicle license number for the motor vehicle. For example, the motor vehicle license number has changed due to a re-registration at a motor vehicle registration center. The altered motor vehicle license number is stored in the first ID token by the registration center. This can be done online in that a secure connection, via which the data with the new motor vehicle license number are written into the first ID token, is established between the first ID token and a server computer. Such a secure connection can be implemented, for example, by means of end-to-end encryption via a client computer to which a reader for the first ID token is connected. The data with the new official motor vehicle license number can be signed by the motor vehicle registration center.

Embodiments of the present invention are particularly advantageous since complete electronic handling of the updating of the official motor vehicle license number is made possible. In particular, it is no longer necessary to produce and attach new license plates. As a result, resources can be saved to a considerable extend and waste can be avoided. Furthermore, the visits to the authorities hitherto associated with the issuance of new motor vehicle license plates are also unnecessary.

Embodiments of the present invention are particularly advantageous since the updating of the official motor vehicle license number by transmitting the data from the first ID token to the motor vehicle electronics device takes place in a particularly secure manner with maximum comfort for the user.

This is achieved by using cryptographic methods based on a PKI, for example for the unilateral or mutual authentication of the motor vehicle electronics device and of the first ID token and/or by checking the signature of the data received from the first ID token by the motor vehicle electronics device and/or by a cryptographic protection of the first connection via which the data are received by the motor vehicle electronics device from the first ID token.

According to one embodiment of the invention, the second interface of the motor vehicle electronics device is constructed to be contactless, for example as a radio interface, particularly as a contactless interface which operates in accordance with an RFID method. In particular, the second interface can be constructed in such a manner that an electronic key of the motor vehicle is also addressed via it. The electronic key can be, for example, a chip card such as, for example, an RFID chip card. However, there can also be a further interface for communicating with the electronic key, especially an RFID interface.

According to one embodiment of the invention, the third interface of the motor vehicle electronics device is constructed to have contacts. For example, the third interface is provided for connecting a cable. In particular, the motor vehicle electronics device can be constructed as a so-called electronic control unit (ECU) of the motor vehicle. For diagnostic and/or maintenance purposes, the ECU is connected to an external device, for example a terminal, a motor vehicle workshop or a technical test station. Via this cable, a connection can then be established between the external device and the ECU via which the certificate can be stored in the memory in order to update it, for example. This can be carried out, for example, during a maintenance of the motor vehicle or during a so-called major examination of the motor vehicle.

According to one embodiment of the invention, the third interface is provided for forming a network connection which can be carried out with contacts or contactlessly.

For example, the third interface is constructed as a mobile radio interface in accordance with a mobile radio standard so that the certificate can be received via mobile radio.

According to one embodiment of the invention, an unambiguous motor vehicle identifier which is stored in the motor vehicle electronics device is first requested via the third interface. The motor vehicle identifier can be, for example, the chassis number of the motor vehicle. Using this motor vehicle identifier, a certificate is then generated or called up which belongs to the relevant motor vehicle or to its display apparatus.

According to one embodiment of the invention, the second interface is constructed for communication with a second ID token. The second ID token is used as access control for the motor vehicle. Possession of the second ID token is a prerequisite for the motor vehicle to be allowed to be opened and/or started by the user. For example, the second ID token is an RFID chip card which is used as electronic key ("E-key").

In the second ID token, a key identifier is stored. This key identifier is requested from the second ID token by the motor vehicle electronics device via its second interface. If the key identifier received via the second interface from the second ID token matches a reference value of the key identifier stored in the motor vehicle electronics device, the motor vehicle electronics device generates a signal, for example for unlocking the central locking system of the motor vehicle and/or enabling starting of the engine of the motor vehicle.

Instead of the second interface, there can also be a further interface for the communication between the motor vehicle electronics device and the second ID token, e.g. a further RFID interface which has a greater range than the second interface. The range of the further interface is selected in such a manner that the second ID token is detected by the motor vehicle electronics device when the second ID token is still outside the motor vehicle whereas the range of the second interface is selected in such a manner that the first ID token must be located within the internal space of the motor vehicle so that the first connection can be established. Thus, the prerequisite for updating the motor vehicle license number is then that the user must first unlock the motor vehicle and enter.

Preferably, it is not the motor vehicle identifier which is selected as key identifier. This has the advantage that in the case of a loss of the second ID token, this second ID token can be replaced by another one in that another key identifier is stored. The second interface of the motor vehicle electronics device is preferably constructed in such a manner that it is possible to access this through the memory area of the motor vehicle electronics device in which the key identifier is stored in order to replace the key identifier, stored there, of the lost second ID token by the new key identifier of the new second ID token. For example, the new key identifier is signed, the motor vehicle electronics device checking the validity of the signature before the old key identifier is replaced by the new key identifier.

According to one embodiment of the invention, the motor vehicle electronics device has means for establishing a secure data transmission channel for actuating the at least one motor vehicle display apparatus. For example, the data transmission via this data transmission channel is encrypted in order to prevent manipulation of the actuation of the at least one display apparatus.

In a further aspect, the invention relates to a motor vehicle with at least one display apparatus arranged such that it is visible from the outside.

According to an embodiment of the invention the motor vehicle comprises an embodiment of the motor vehicle electronic system according to the invention. Such a motor vehicle is especially advantageous because updating the license number can be performed in a comfortable and at the same time safe kind. In particular it is especially advantageous that changing the license plate can be avoided when changing the license number which has been necessary until now. Thereby the production costs of the new license plates, the logistic effort for providing them and the costs for disposal of the old license can be dispensed.

In a further aspect, the invention relates to a method for displaying data on an embodiment of a motor vehicle display apparatus according to the invention. A necessary condition for displaying the data is that the data is received signed from a sender and that this signature is valid. For checking the validity of the signature a certificate, in particular a so called root certificate, stored in a memory area of the motor vehicle display apparatus is used. Updating the root certificate is performed via the interface of the motor vehicle display apparatus, for example triggered by a regular maintenance and/or on the occasion of a general inspection.

In a further aspect, the invention relates to a computer program product comprising executable program instructions for performing an embodiment of a method according to the invention. For example the computer program is adapted to be executed by a micro processor of the electronic device of the motor vehicle display apparatus.

Figure 2:
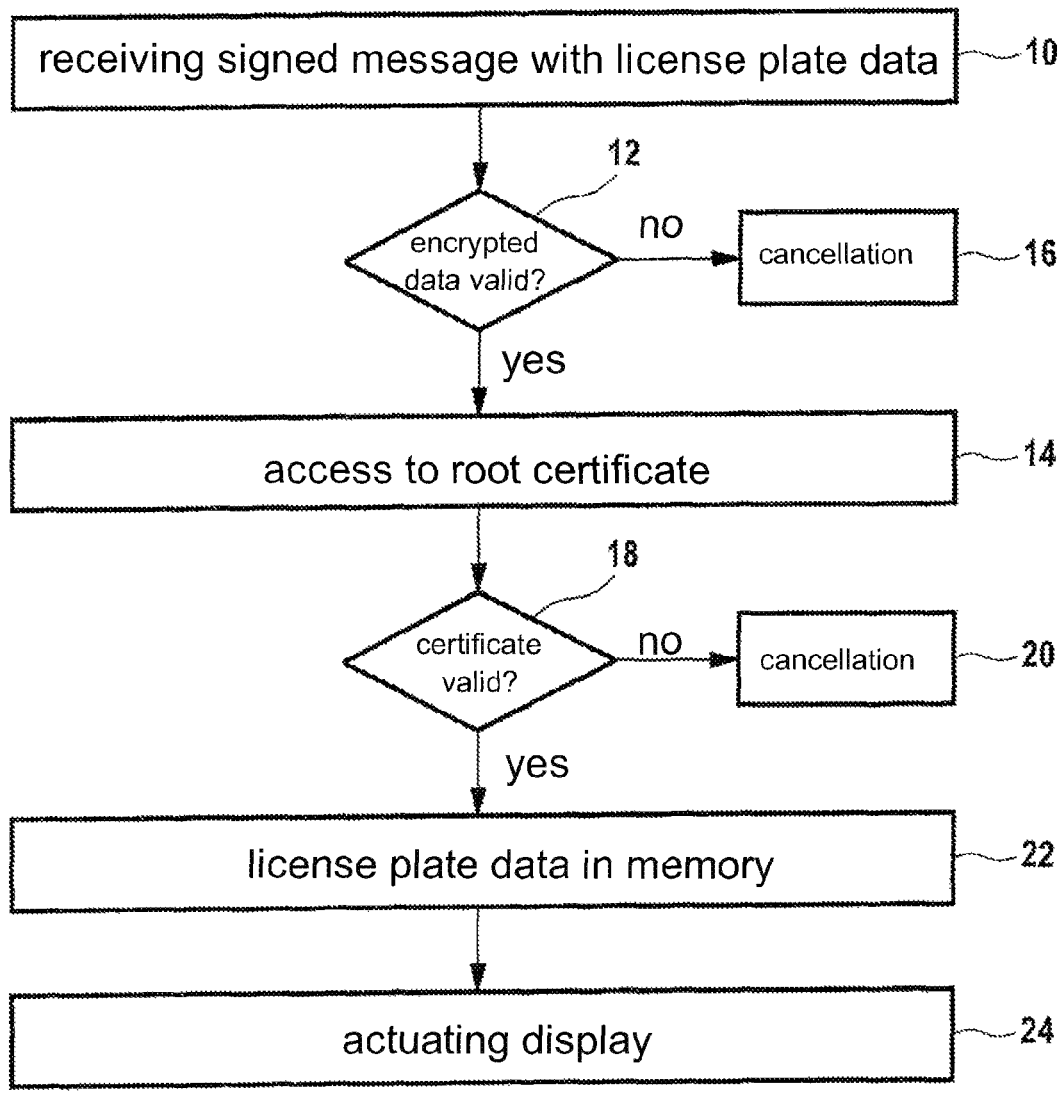
Figure 3:
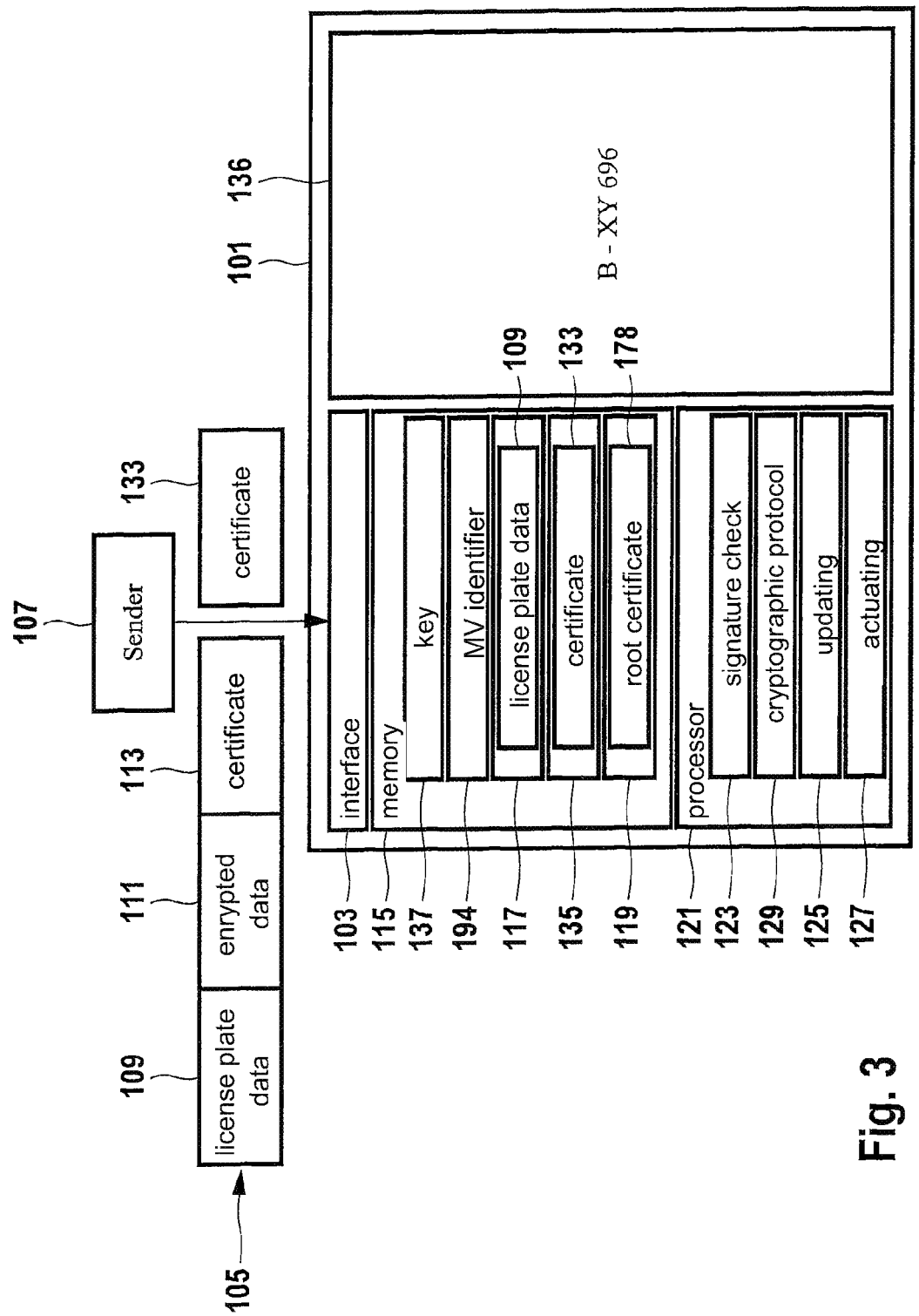
Figure 4:
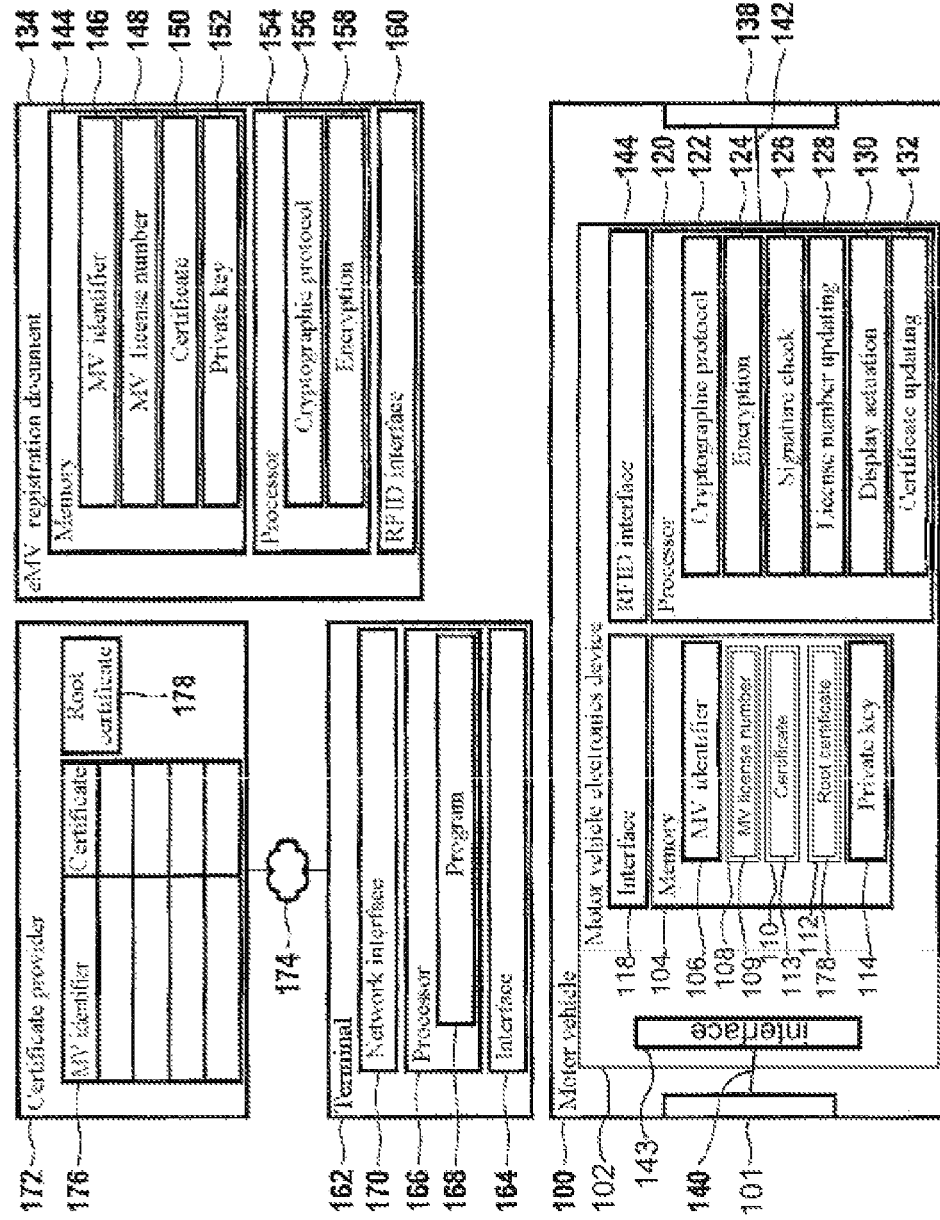
Figure 5:
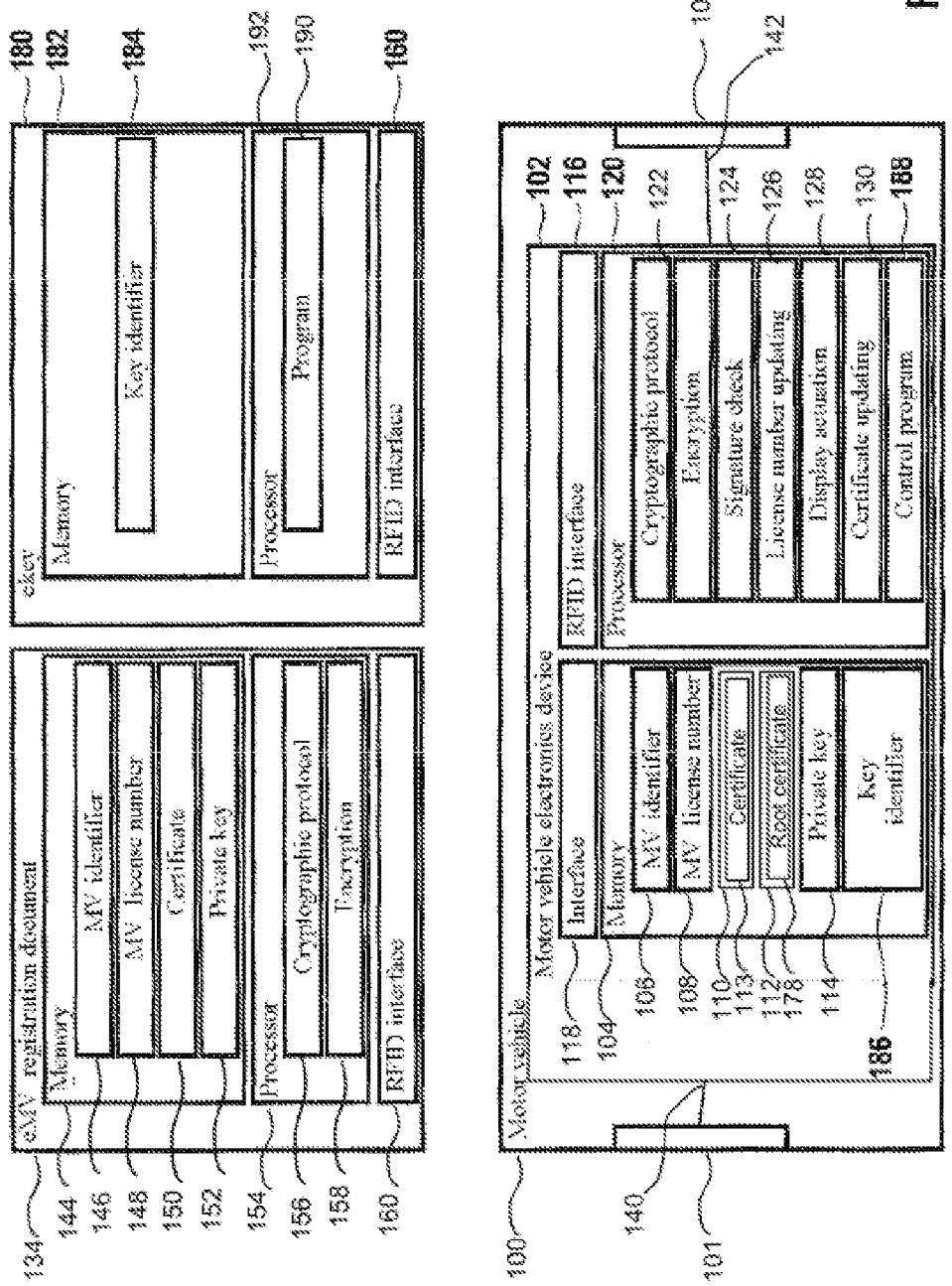

In the further text, embodiments of the invention are explained in greater detail with reference to the drawings, in which:

FIG. 1 shows a block diagram of a first embodiment of a motor vehicle display apparatus according to the invention, FIG. 2 shows a flow chart of an embodiment of a method according to the invention, and FIG. 3 shows a block diagram of a further embodiment of a motor vehicle display apparatus according to the invention, FIG. 4 shows a block diagram of an embodiment o motor vehicle electronics system according to the invention and a motor vehicle according to the invention FIG. 5 shows a block diagram of a further embodiment of a motor vehicle electronics system according to the invention and a motor vehicle according to the invention.

Mutually corresponding elements of the following embodiments are in each case identified using the same reference symbols.

FIG. 1 shows an embodiment of a motor vehicle display apparatus 101 according to the invention. The motor vehicle display apparatus 101 has a display 136 which can have the design of a common motor vehicle license plate. Display 136 serves for displaying the official license number such as the official license number B-XY 696.

Motor vehicle display apparatus 101 has an interface 103 for receiving for example a message 105 from a sender 107. Message 105 can for example comprise the data to be displayed on display 136, i.e. the license plate data 109, encrypted data 111 and a certificate 113. By the encrypted data 111 and the certificate 113 a digital signature of the license plate data 109 is generated. For example the encrypted data 111 is generated by encrypting the license plate data by using a private cryptographic key, wherein this private cryptographic key must be assigned to the public key specified in the certificate 113.

Further a so called root certificate 178 can be received via interface 103.

Motor vehicle display apparatus 101 has an electronic memory 115 comprising a memory area 117 for storing the license plate data and a memory area 119 for storing the root certificate 178.

Motor vehicle display apparatus 101 further has a processor 121 for executing a program module 123 for executing a check of a signature, a program module 125 for updating the root certificate 178, which is stored in the memory area 119, as well as a program module 127 for actuating display 136. The functionality of actuating the display 136 can be realized by using a driver, which can be designed as a part of the processor 121 as a separate component or as an integral part of the display 136.

The root certificate 178 has a defined validity time of for example three years. The root certificate 178 can for example by stored in the memory area 119 by the producer such that a motor vehicle provided with the motor vehicle display apparatus 101 already comprises a valid root certificate when being delivered to a client.

For example an official license number is assigned to the motor vehicle by a motor vehicle registration office. The respective license plate data 109 are encrypted with a private key, e.g. of the motor vehicle registration office, such that the encrypted data 111 is provided. Message 105 comprising license plate data 109, encrypted data 111 as well as certificate 113 of the motor vehicle registration office is then sent from the sender 107 to interface 103 of the motor vehicle display apparatus 101. Then the program module 123 is started for checking the signature of message 105. For this the following checkings are performed in detail:

1. The encrypted data 111 is decrypted by using the public key specified by the certificate 113. The result of the decryption of the encrypted data 111 must match the license plate data 109 in order that the signature can be valid.

2. The certificate 113 is subject to a certificate chain checking by using the root certificate 178 being stored in the memory area 119. A further condition for the validity of the signature is a successful certificate chain checking.

If the signature of message 105 is valid the license plate data 109 are written into the memory area 117, wherein by this license plate data having been stored previously are overwritten.

Program module 127 is executed permanently and accesses memory area 117, where the respectively current license plate data 109 is stored. By updating the license plate data in memory area 117 the license plate being displayed on display 136 of the motor vehicle is changed respectively.

Since the root certificate being stored in memory area 119 has only a limited validity time it is updated from time to time. For this the following procedure is performed: if a root certificate 178 is received by interface 103 the root certificate being stored in the memory area 119 is replaced by the newly received root certificate 178 by executing program module 125. This is performed by overwriting the root certificate in memory area 119.

Message 105 and root certificate 178 can be received from the same sender 107 or from different senders 107. For example sender 107 is assigned to the motor vehicle registration office, in particular sender 107 can be designed as ID token 134 (cf. FIGS. 4 and 5 below).

A sender 107 for sending root certificate 178 can for example be designed as motor vehicle electronics device 102 (cf. the embodiment of FIGS. 4 and 5) or as terminal 162 for example of a motor vehicle workshop or of a motor vehicle testing institute such as the Technical Control Board such that root certificate 178 is sent to interface 103 on occasion of routine maintenance or general inspection.

FIG. 2 shows a flow diagram of an embodiment of a method according to the invention. In step 10 the motor vehicle display apparatus receives a signed message comprising license plate data and a signature of the license plate data, wherein the signature is formed by encrypted data of the license plate data and a matching certificate.

In step 12 it is checked if the encrypted data is valid. For this the encrypted data is for example decrypted by using the public key which is specified in the certificate of the message. If the result of the decryption matches the license plate data of the message the encrypted data is considered as valid and the flow control proceeds to step 14, in the contrary case a cancellation is performed in step 60.

In step 14 the root certificate being stored in the memory of the motor vehicle display apparatus is accessed in order to check in step 18 if the certificate of the signature received with the message is valid. For this a certificate chain checking is performed by using the root certificate. If the certificate is not valid cancellation is performed in step 20.

If the certificate is valid the license plate data received in step 22 with the message are stored in the memory of the motor vehicle display apparatus in order to actuate in step 24 a display of the motor vehicle display apparatus such that the updated license plate data is displayed by the display.

FIG. 3 shows a block diagram of an embodiment of a motor vehicle display apparatus 101 according to the invention to which a certificate 133 is assigned. Electronic memory 115 of the motor vehicle display apparatus 101 has a memory area 135 for storing certificate 133. As well as the root certificate 178 (cf. FIG. 1) the certificate 133 has a limited validity time. Preferably the validity times of the root certificate 178 and of the certificate 133 are chosen such that they expire at the same time. Thereby the frequency of the updating procedures can be minimized.

A private key of the motor vehicle display apparatus 101 is stored in a protected memory area 137 in electronic memory 115 of the motor vehicle display apparatus 101. Certificate 133 is assigned to this private key because certificate 133 comprises a public key, wherein an asymmetric key pair is formed by the private and the public key.

Processor 121 serves additionally to the embodiment of FIG. 1 for executing a program module 129 by which the steps of a cryptographic protocol concerning the motor vehicle display apparatus 101 are implemented. By executing the cryptographic protocol a unilateral or a mutual authentication of the motor vehicle display apparatus 101 and sender 107 can be performed, e.g. according to a so called challenge response method.

Certificate 133 can be stored in memory area 135 initially by the manufacturer such that certificate 133 is stored already in memory 115 when the new motor vehicle is delivered to the client.

If in the embodiment considered herein initializing or updating the license plate data shall be performed first a unilateral or a mutual authentication has to be performed. For this for example the following procedure is performed:

Program module 129 accesses the certificate 133 being stored in memory area 135 in order to send it from interface 103 to sender 107. Sender 107 then generates a so called challenge, i.e. for example a random number. This random number is encrypted with the public key being comprised in certificate 133.

The resulting encrypted data is sent from sender 107 to interface 103. Program module 129 decrypts the encrypted data by using the private key being stored in memory area 137 and obtains in this way the random number. The program module 129 sends this random number via interface 103 back to sender 107. On the side of the sender it is checked if the random number received from the motor vehicle display apparatus matches the originally generated random number, i.e. the challenge. If this is the case the motor vehicle display apparatus is considered as authenticated to sender 107. An authentication of sender 107 to motor vehicle display apparatus 101 can be performed analogously.

Interface 103 is ready for receiving message 105 only after the unilateral or the mutual authentication has been performed.

For updating certificate 133 the following procedure can be performed:

Sender 107 sends the updated certificate 133 to interface 103. By executing program module 125 the updated certificate 133 is written into memory area 135, wherein the previous certificate is overwritten. The public key of certificate 133 remains unchanged because the private key being stored in memory area 137 shall also be kept unchanged.

Additionally message 105 can comprise identifying information which can also be signed. This identifying information can be the motor vehicle identifier being stored in memory area 194 of a motor vehicle electronics device 102 (cf. the embodiment of FIGS. 4 and 5). The motor vehicle display apparatus 101 then checks additionally to the validity of the signature if the identifying data being received with message 105 matches the motor vehicle identifier being stored in memory area 194 of motor vehicle display apparatus 101. This can be a further condition for writing the license plate data into memory area 117.

FIG. 4 diagrammatically shows a motor vehicle 100 such as, for example, a passenger car. The motor vehicle 100 has at least one motor vehicle electronics device 102 which, for example, can be constructed as a so-called electronic control unit (ECU).

The motor vehicle electronics device 102 has an electronic memory 104 with at least the memory areas 106, 108, 110, 112 and 114. Memory area 106 is used for storing a motor vehicle identifier, i.e. a so-called unique identifier such as, for example, the chassis number of the motor vehicle 100. The memory area 106 is preferably arranged in such a manner that the motor vehicle identifier stored there cannot be changed so that the motor vehicle electronics device 102 is thus permanently allocated to the motor vehicle 100.

The memory area 108 is used for storing data which contain the official motor vehicle license number of the motor vehicle 100, i.e. the license plate data (cf. FIGS. 1 and 3). These data can be updated via an interface 116 of the motor vehicle electronics device 102. In the embodiment considered here, the interface 116 is constructed contactlessly as a radio interface which operates in accordance with an RFID method.

Memory area 110 is used for storing a certificate of the motor vehicle 100, wherein the certificate can be, for example, a standardized certificate of a PKI. Memory area 112 is used for storing a so-called root certificate of the PKI.

In memory area 114 of the memory 104, the private key of the motor vehicle 100 belonging to the certificate 110 is stored. In principle, this memory area 114 cannot be accessed externally via the interface 116 or via a further interface 118 of the motor vehicle electronics device 102.

Interface 118 is constructed, for example, with contacts for connecting a cable. Via interface 118, memory areas 110 and 112 can be accessed externally in order to update the certificate 1113, the certificate 133 and/or the root certificate.

The motor vehicle electronics device 102 also has at least one processor 120 for executing program modules 122, 124, 126, 128, 130 and 132.

Program module 122 is used for executing the steps relating to the motor vehicle electronics device 102, of a cryptographic protocol for authenticating the motor vehicle electronics device 102 with respect to an ID token 134. The program module 122 is preferably constructed in such a manner that an authentication of the ID token 134 with respect to the motor vehicle electronics device 102 also takes place.

Program module 124 is used for encrypting data which are exchanged between the motor vehicle electronics device 102 and the ID token 134. In this process, an encryption with a symmetric or an asymmetric key can take place.

Program module 126 is used for carrying out a signature check of an electronic signature received from the ID token 134. For this purpose, the program module 126 accesses the memory area 112 for calling up the root certificate 178 there.

Program module 128 is started for updating the data stored in memory area 108, which data contain the official motor vehicle license number. Program module 130 is used for driving motor vehicle display apparatuses 101 and 101' of the motor vehicle 100. Motor vehicle display apparatuses 101 and 101' can be arranged there at the motor vehicle 100 where usually the license plates are arranged. Motor vehicle display apparatuses 101 and 101' are connected to the motor vehicle electronics device 102 via secure data transmission channels 140 and 142, respectively. For example, the data transmission channels 140 and/or 142 can be implemented via a bus system of the motor vehicle 100. For this the motor vehicle electronics device 102 has an interface 143 via which the data transmission channels 140 and 142 can be established with the motor vehicle display apparatuses 101 and 101'.

Program module 132 is started in order to update the certificate 113 stored in memory area 110 and/or the root certificate stored in memory area 112 and/or the certificate 133 via the interface 118.

The motor vehicle electronics device 102 can be implemented as a system consisting of a number of spatially separate electronic components which, for example, are connected to one another via a bus system of the motor vehicle 100. Correspondingly, memory 104 can also be implemented distributed over various such components which altogether form the motor vehicle electronics device 102. This correspondingly applies to processor 120.

The ID token 134 has an electronic memory 144 with protected memory areas 146, 148, 150 and 152. Memory area 146 is used for storing the motor vehicle identifier, which is also stored in memory area 106 of the memory 104 of the motor vehicle electronics device 102. By this means, the ID token 134 is unambiguously allocated to the motor vehicle 100. In memory area 146, a signature of the motor vehicle identifier can be additionally stored.

In memory area 148, license plate data 109 are stored which contain the current official motor vehicle license number of the motor vehicle 100. In addition, a digital signature of these data 109 can be stored in memory area 148. These data 109 can have been written into memory area 148 by a server computer of the motor vehicle registration center.

Memory area 150 is used for storing a certificate of the ID token 134. Memory area 152 is used for storing a private key to which the certificate stored in memory area 150 is allocated.

The ID token 134 also has a processor 154 for executing program modules 156 and 158 which correspond to program modules 122 and 124. Program module 156 is used for executing the steps of the cryptographic protocol relating to the ID token 134. Program module 158 is used for establishing the encrypted connection to the motor vehicle electronics device 102, especially a connection with end-to-end encryption with the aid of a symmetric or asymmetric key.

The ID token 134 also has an interface 160 which corresponds to the interface 116 of the motor vehicle electronics device 102 and which is constructed, for example, as a radio interface which operates in accordance with an RFID method.

The ID token 134 can be a document such as, for example, an electronic vehicle certificate of title or an electronic vehicle registration document as shown in FIG. 1. The document can be designed, for example, to be card-shaped.

The motor vehicle electronics device 102 can be connected to a terminal 162 via its interface 118. Terminal 162 has an interface 164 which corresponds to the interface 118 of the motor vehicle electronics device 102. Interfaces 164 and 118 can be connected, for example, by means of a cable, for which purpose the engine hood of the motor vehicle 100 must be typically opened.

Terminal 162 has at least one processor 166 for executing a program 168 and a network interface 170 for communicating with a server computer 172 via a network 174.

The server computer 172 provides a certificate provider, for example in the form of a database 176, in which the current certificates for various motor vehicles and their motor vehicle display apparatuses are stored. In this context, the respective motor vehicle identifier is used as access key for the certificates stored in database 176. In addition, the server computer 172 can also supply an updated root certificate 178.

To update the motor vehicle license number, the following procedure is adopted:
  1. Firstly, the user, i.e. the owner of motor vehicle 100, for example, calls up an online service of a server computer, for example of a motor vehicle registration authority. This can be done via a personal computer of the owner via the internet. The personal computer has a reader for communication with the ID token 134. Via the personal computer and its reader, a secure connection to the server of the motor vehicle registration center is established via which the data with the current motor vehicle license number and possibly the signature for said data are written into the memory area 146 of the ID token 134.
  2. When the user with the ID token 134 is located within the range of reception of the interface 116, the program module 128 is started in order to update the motor vehicle license number. This can be done manually in that the user operates an operating element of the motor vehicle 100 which, for example, can be arranged on the instrument panel of the motor vehicle 100. However, program module 128 can also be executed continuously. By executing program module 128, signals are sent out cyclically within certain time intervals by the interface 116 in order to check whether the ID token 134 is located within the range of reception of the interface 116.

The motor vehicle license number is then updated in such a manner that a connection is established between interfaces 116 and 160. For example, program module 128 accesses the certificate 113 stored in memory area 110 in order to send it from interface 116 to the ID token 134. Program module 156 of the ID token 134 then generates a so-called challenge, i.e., for example, a pseudo-random number. This pseudo-random number is encrypted with the public key, contained in the certificate 113, of the motor vehicle 100.

The resultant enciphered text is transmitted by the ID token 134 via the connection to the interface 116 of the motor vehicle electronics device 102. Program module 122 decrypts the enciphered text with the aid of the private key, stored in memory area 114, of the motor vehicle 100 and thus obtains the pseudo-random number. This pseudo-random number is sent back by the program module 122 to the ID token 134 via the interface 116.

By executing program module 156, a check is made there whether the pseudo-random number received by the motor vehicle electronics device 102 corresponds to the originally generated pseudo-random number, i.e. the challenge. If this is so, the motor vehicle electronics device 102 is considered to be authenticated with respect to the ID token 134. The pseudo-random number can be used as symmetric key for the end-to-end encryption which is carried out by program modules 124 and 158, respectively.

Analogously, the ID token 134 can be optionally authenticated with respect to the motor vehicle electronics device 102.

The unilateral or mutual authentication can also include the motor vehicle identifier, which is stored in memory areas 106 and 146, respectively. For example, ID token 134 transmits the motor vehicle identifier signed by the ID token 134 to the motor vehicle electronics device 102. The motor vehicle electronics device 102 then checks the signature and compares the motor vehicle identifier received from the ID token 134 with the motor vehicle identifier stored in memory area 106. If the signature is valid and the motor vehicle identifiers match, ID token 134 is considered to be authentic.
  3. Once the unilateral or mutual authentication of the motor vehicle electronics device 102 and of the ID token 134 has taken place, the motor vehicle electronics device 102 receives a read authorization for accessing the memory area 148 of the ID token 134. Program module 128 then transmits a corresponding read command from the interface 116 to the ID token 134. The ID token 134 thereupon reads the license plate data 109, possibly including the signature, out of memory area 148 and transmits it via the connection with end-to-end encryption to the interface 116. Program module 128 then starts program module 126 in order to check the signature of the data 109 with the aid of the root certificate 112. If the signature is valid, the data are stored in memory area 108 during which process the data previously stored there can be overwritten.

By executing program module 130 message 105 (cf. FIG. 1 and FIG. 3) is generated. This can be performed such that the license plate data 109 is encrypted with the private key stored in memory area 114 in order to generate the encrypted data 111. Message 105 is then sent via data transmission channels 140 and 142 to the motor vehicle display apparatuses 101 and 101' respectively, where the license plate data is updated correspondingly such that the updated license plate data is displayed on the displays of the motor vehicle display apparatuses 101 and 101'.

To update the certificates 113 and 178 respectively stored in memory areas 110 and 112, the following procedure is adopted:

A connection is established between interfaces 118 and 164, for example via a cable. By executing program 168, the motor vehicle identifier is read out of memory area 106 of the motor vehicle electronics device 102. Program 168 then generates a request for the server computer 172 which contains this motor vehicle identifier.

This request is transmitted by terminal 162 from its network interface 170 via network 174 to the server computer 172. On the basis of this request, the server computer accesses the database 176 in order to read out the current certificate 113 allocated to the motor vehicle identifier with the aid of the motor vehicle identifier. The certificate 113 and the current root certificate 178 are transmitted from the server computer 172 via network 174 to terminal 162 and are transmitted from there via the connection between the interface 164 and the interface 118 by execution of program 168 to the motor vehicle electronics device, where the current certificate 113 is stored in memory area 110 and the current root certificate 178 is stored in memory area 112 by overwriting the certificates in each case previously stored there.

The terminal can belong, for example, to a workshop which updates the certificates in this manner on the occasion of routine maintenance of the motor vehicle 100. The terminal can also belong to a test center such as, for example, the Technical Inspection Agency (TÜV) which updates the certificates on the occasion of a so-called major examination.

In an alternative embodiment, the interface 118 is constructed in such a manner that it can communicate directly with the server computer 172 such as, for example, via a mobile radio link.

Also the current certificates 113 of the motor vehicles display apparatuses of the motor vehicles can be stored in database 176 in addition to the current certificates 113. Then also the current certificates 133 and 133' of the motor vehicle display apparatuses 101 and 101' respectively of the motor vehicle are received by interface 118 in addition to the current certificate 113 and the current root certificate 178. Motor vehicle electronics device 102 then forwards root certificate 178 via the data transmission channels 140 and 142 to the motor vehicle display apparatuses 101 and 101' respectively in order to update the root certificates stored there (cf. embodiment of FIG. 1).

Further motor vehicle electronics device 102 also forwards the updated certificates 133 and 133' via data transmission channels 140 and 142 to the motor vehicle display apparatuses 101 and 101 respectively such that the certificates stored there are respectively updated (cf. embodiment of FIG. 3).

FIG. 5 shows a further embodiment of the invention. In addition to the embodiment of FIG. 1, the interface 116 of the motor vehicle electronics device 102 is constructed for communicating with a corresponding interface 160 of a further ID token 180. ID token 180 may be designed, for example, as an electronic key. ID token 180 has a memory 182 for storing a key identifier 184 of the ID token 180. The key identifier is an identifier by means of which the ID token 180 is unambiguously or almost unambiguously identified.

A reference value for this key identifier 184 is stored in a memory area 186 of the motor vehicle electronics device 102.

Processor 120 of the motor vehicle electronics device 102 is here used additionally to execute a control program 188.

By executing the control program 188, signals are cyclically emitted by the interface 116. When the ID token 180 is within range of the interface 116, the ID token 180 responds to such a signal by transmitting the key identifier 184 to interface 116. This is performed by executing program 190 by processor 192. The control program 188 then checks the key identifier 184 received via the interface 116 with the reference value stored in memory area 186. In the case of a match, control program 188 drives a central locking system of the motor vehicle 100 in order to release the opening of the doors. As an alternative or in addition, control program 188 can enable actuation of the starter of the motor vehicle 100.

If, in addition to the ID token 180, ID token 134 is also within range of the interface 116, the control program 188 starts program module 128 for updating the license number.

List of Reference Designations

100 Motor vehicle
101 Motor vehicle display apparatus
102 Motor vehicle electronics device
103 Interface
104 Memory
105 Message
106 Memory area
107 Sender
108 Memory area
109 License plate data
110 Memory area
111 Encrypted data
112 Memory area
113 Certificate
114 Memory area
115 Electronic memory
116 Interface
117 Memory area
118 Interface
119 Memory area
120 Processor
121 Processor
122 Program module
123 Program module
124 Program module
125 Program module
126 Program module
127 Program module
128 Program module
129 Program module
130 Program module
132 Program module
133 Certificate
134 ID token
135 Memory area
136 Display
137 Memory area
138 Display
140 Data transmission channel
142 Data transmission channel 143 Interface
144 Memory
146 Memory area
148 Memory area
150 Memory area
152 Memory area
154 Processor
156 Program module
158 Program module
160 Interface
162 Terminal
164 Interface
166 Processor
168 Program
170 Network interface
172 Server computer
174 Network
176 Database
178 Root certificate
180 ID token
182 Memory
184 Key identifier
186 Memory area
188 Control program
190 Program
192 Processor
194 Memory area

What we claim is:

1. A motor vehicle display apparatus with an electronic device, comprising:
   a first memory area for storing data,
   a second memory area for storing at least a first certificate,
   a first interface for receiving the data, a signature of the data and the at least first certificate from a sender,
   wherein the motor vehicle display apparatus is capable of checking validity of the signature of the data by using the first certificate, wherein the data is only stored in the first memory area if the signature is valid,
   a display apparatus for displaying the data stored in the first memory area,
   a third memory area for storing a motor vehicle identifier, wherein the motor vehicle identifier identifies a motor vehicle unambiguously, to which the motor vehicle display apparatus is assigned, wherein the third memory area is a protected memory area, wherein the first interface is adapted to receive a message, wherein the message comprises at least the data, identifying information and the signature of the data and/or of the identifying information, and is capable of checking if the identifying information matches the motor vehicle identifier stored in the third memory area, wherein a condition for storing the data in the first memory is that the identifying information and the motor vehicle identifier match each other,
   and wherein the display apparatus and the electronic device form a structural unit.

2. The motor vehicle display apparatus according to claim 1, wherein the validity checking comprises checking of a certificate chain by using the first certificate.

3. The motor vehicle display apparatus according to claim 1, wherein the electronic device is an integrated electronic circuit.

4. The motor vehicle display apparatus according to claim 1, wherein the electronic device and the display apparatus are connected to each other inseparably.

5. The motor vehicle display apparatus according to claim 1, wherein the first interface is a radio interface.

6. The motor vehicle display apparatus according to claim 1, wherein the first interface is adapted for reception from a motor vehicle electronic device.

7. The motor vehicle display apparatus according to claim 6, wherein the first interface is a motor vehicle bus system interface.

8. The motor vehicle display apparatus according to claim 1, additionally comprising a cryptographic authentication unit, said cryptographic authentication unit capable of authenticating cryptographically the sender, wherein storing the data in the first memory area requires that the cryptographic authentication has been performed successfully.

9. The motor vehicle display apparatus according to claim 8, wherein a second certificate is stored in a fourth memory area of the electronic device, wherein the second certificate is assigned to the electronic device, and wherein the cryptographic authentication unit is adapted for mutual authentication, wherein the authentication of the motor vehicle display apparatus to the sender is performed by using the second certificate.

10. The motor vehicle display apparatus according to claim 8, wherein the cryptographic authentication unit is adapted to perform a challenge response protocol.

11. The motor vehicle display apparatus according to claim 1, wherein the data comprise a motor vehicle license number.

12. A motor vehicle electronics system comprising at least a motor vehicle display apparatus according to claim 1 and comprising a motor vehicle electronics device, comprising
   a second interface for establishing a first connection to a first ID token in order to read data from the first ID token,
   a fifth memory area for storing the first certificate,
   a sixth memory area for storing a third certificate, wherein the third certificate is assigned to the motor vehicle electronics device,
   wherein the motor vehicle electronics device is capable of cryptographically authenticating the first ID token using the first and/or the third certificate,
   a third interface for receiving at least the first, second and third certificates,
   a fourth interface for actuating at least one of the motor vehicle display apparatuses via the first interface for updating the data and the first and the second certificates.

13. A motor vehicle comprising at least one motor vehicle display apparatus according to claim 1 being arranged visibly from outside.

14. A method for displaying data on a motor vehicle display apparatus comprising the following steps:
   receiving the data and a signature of the data by a first interface,
   checking validity of the signature by using a first certificate stored in a second memory area,
   storing the data in a first memory area, if the signature is valid,
   storing a motor vehicle identifier in a third memory, wherein the motor vehicle identifier identifies a motor vehicle unambiguously, to which the motor vehicle display apparatus is assigned, wherein the third memory area is a protected memory area, wherein the first interface is adapted to receive a message, wherein the message comprises at least the data, identifying information and the signature of the data and/or of the identifying information, and is capable of checking if the identifying information matches the motor vehicle identifier stored in the third memory area, wherein a condition for storing the data in the first memory is that the identifying information and the motor vehicle identifier match each other,
   actuating a display apparatus for displaying the data.

15. The method according to claim 14, wherein a certificate chain check is performed for checking the validity of the signature.

16. The method according to claim 14, wherein a condition for storing the data in the first memory area is that an authentication of a sender from which the data and their signature has been received, has been performed successfully.

17. The method according to claim 16, wherein an additional condition for storing the data in the first memory area is that an authentication of the motor vehicle display apparatus to the sender has been performed successfully.

18. The method according to claim 14, wherein the sender is a motor vehicle electronics device, and wherein the motor vehicle electronics device receives the data from an ID token by the following steps:
  establishing a first connection between the motor vehicle electronics device and the ID token,
  accessing a memory of the motor vehicle electronics device for reading a third certificate,
  authenticating cryptographically the motor vehicle electronics device to the ID token by using the certificate,
  reading the data from the first ID token via the first connection after having successfully performed the authentication of the motor vehicle electronics device to the first ID token,
  sending the data from the motor vehicle electronics device to the motor vehicle display apparatus for updating the data displayed by the motor vehicle display apparatus.

19. A non-transitory computer readable medium comprising instructions executable on a computer, the instructions comprising the following steps:
  receiving the data and a signature of the data by a first interface,
  checking validity of the signature by using the first certificate stored in a second memory area,
  storing the data in a first memory area, if the signature is valid,
    storing a motor vehicle identifier in a third memory, wherein the motor vehicle identifier identifies a motor vehicle unambiguously, to which the motor vehicle display apparatus is assigned, wherein the third memory area is a protected memory area, wherein the first interface is adapted to receive a message, wherein the message comprises at least the data, identifying information and the signature of the data and/or of the identifying information, and is capable of checking if the identifying information matches the motor vehicle identifier stored in the third memory area, wherein a condition for storing the data in the first memory is that the identifying information and the motor vehicle identifier match each other,
  actuating a display apparatus for displaying the data.

* * * * *